United States Patent [19]
Oliver et al.

[11] Patent Number: 5,375,458

[45] Date of Patent: Dec. 27, 1994

[54] LEAK TEST FIXTURE

[75] Inventors: Dale M. Oliver, Morgan Hill; Robert S. Tsukida, San Jose; Frank Ortega, San Jose; Herbert B. Dela Rosa, San Jose; Douglas K. Ethridge, San Jose; Harry I. Russell, San Jose; Bettadapur N. Sridhar, Cupertino, all of Calif.

[73] Assignee: General Electric Company, San Jose, Calif.

[21] Appl. No.: 135,206

[22] Filed: Oct. 12, 1993

[51] Int. Cl.⁵ .............................. G01M 3/00
[52] U.S. Cl. ..................... 73/49.8; 376/250
[58] Field of Search ............. 73/49.8, 46, 40; 376/250

[56] References Cited
U.S. PATENT DOCUMENTS 5,245,640 9/1993 Lingenfelter et al. ............ 73/49.8 X

OTHER PUBLICATIONS

GE Manual, "Control Rod Drive–Model 7RDB144B", Leak Test Fixture, p. 11, May 1971.

Primary Examiner—Hezron E. Williams
Assistant Examiner—Joseph W. Roskos
Attorney, Agent, or Firm—J. S. Beulick

[57] ABSTRACT

A multi-port tool which tests for leaks in the seals of a control rod drive that has been removed from its housing. The fixture is attached to the flange of the control rod drive using quick-release clamps. Two ports of the fixture are respectively coupled to the insert and withdraw ports of the control rod drive. A source of demineralized water at a constant pressure is applied to an inlet port of the leak test fixture. The pressurized water is applied to the control rod drive while the index tube is restrained by a restraining rig. A number of valves are selectively opened or closed to provide a flow path for the pressurized water to either the insert port or the withdraw port. The leakage rate at each of a number of leakage points is determined when the pressurized water is applied at the insert port only and again when the pressurized water is applied at the withdraw port only.

15 Claims, 5 Drawing Sheets

LEAK TEST FIXTURE

FIELD OF THE INVENTION

This invention relates generally to maintenance of a control rod drive of a boiling water reactor. Specifically, the invention relates to tools for dismantling or assembling a control rod drive during a maintenance operation.

BACKGROUND OF THE INVENTION

Figure 1:
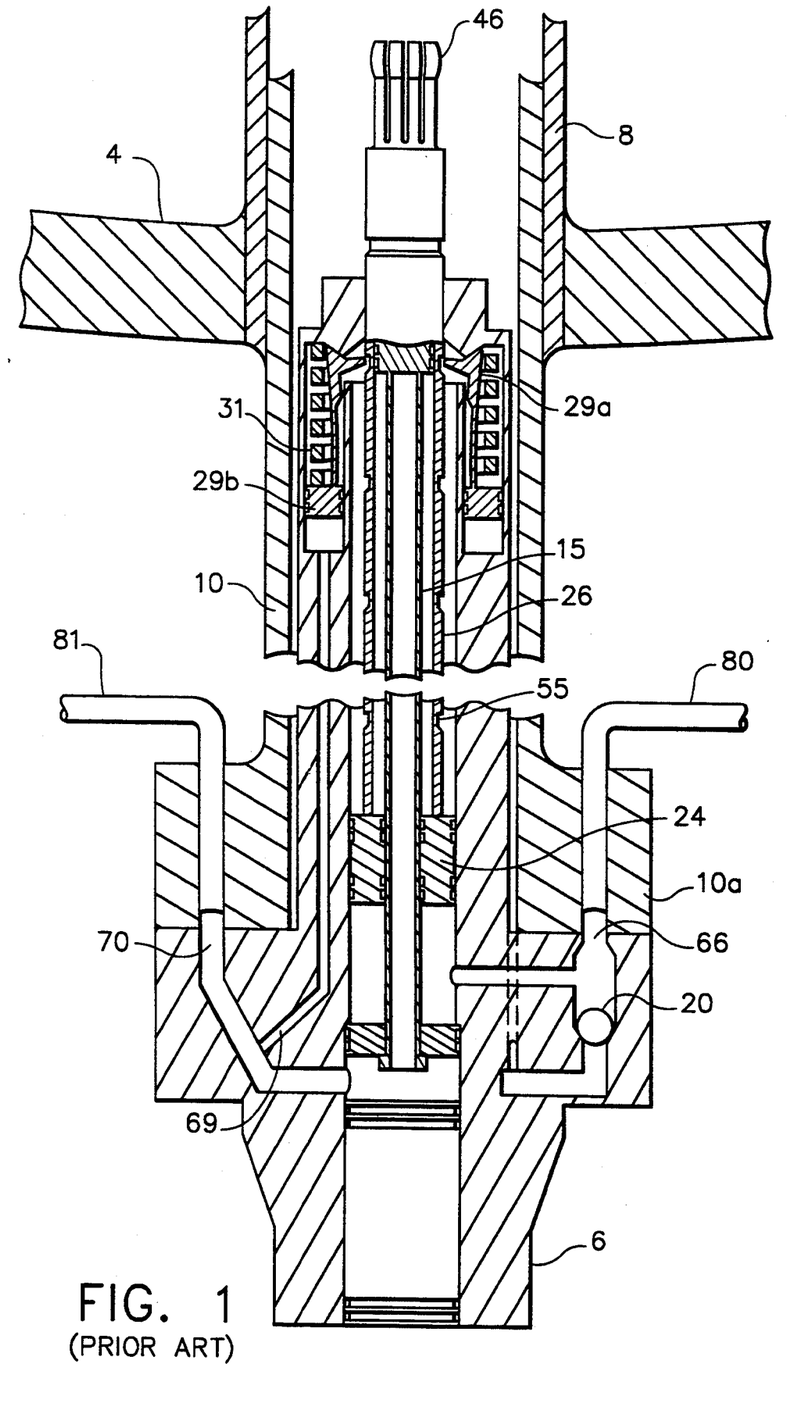
FIG. 1 is a sectional schematic of a conventional control rod drive installed in a BWR.

Control rod drives (CRDs) are used to position control rods in boiling water reactors (BWRs) to control the fission rate and fission density, and to provide adequate excess negative reactivity to shutdown the reactor from any normal operating or accident condition at the most reactive time in core life. Referring to FIG. 1, each CRD is mounted vertically in a CRD housing 10 which is welded to a stub tube 8, which in turn is welded to the bottom head of the reactor pressure vessel 4. The CRD flange 6 is bolted and sealed to the flange 10a of the CRD housing 10, which contains ports for attaching the CRD hydraulic system lines 80, 81. Demineralized water supplied by the CRD hydraulic system serves as the hydraulic fluid for CRD operation.

As shown schematically in FIG. 1, the CRD is a double-acting, mechanically latched hydraulic cylinder. The CRD is capable of inserting or withdrawing a control rod (not shown) at a slow controlled rate for normal reactor operation and of providing rapid control rod insertion (scram) in the event of an emergency requiring rapid shutdown of the reactor. A locking mechanism in the CRD permits the control rod to be positioned at 6-inch (152.4-mm) increments of stroke and to be held in these latched positions until the CRD is actuated for movement to a new position. A spud 46 at the top of the index tube 26 (the moving element) engages and locks into a socket at the bottom of the control rod. Once coupled, the CRD and control rod form an integral unit which must be manually uncoupled by specific procedures before a CRD or control rod may be removed from the reactor.

When installed in the reactor, the CRD is wholly contained in housing 10. The CRD flange 6 contains an insert port 66, a withdraw port 70 and an integral two-way check valve (with a ball 20). For normal drive operation, drive water is supplied via an associated hydraulic control unit (HCU) to the insert port 66 for drive insertion and/or to withdraw port 70 for drive withdrawal. For rapid shutdown, reactor pressure is admitted to the two-way check valve from the annular space between the CRD and a thermal sleeve (not shown) through passages in the CRD flange, called scram vessel ports. The check valve directs reactor pressure or external hydraulic pressure to the underside of drive piston 24.

Figure 2A:
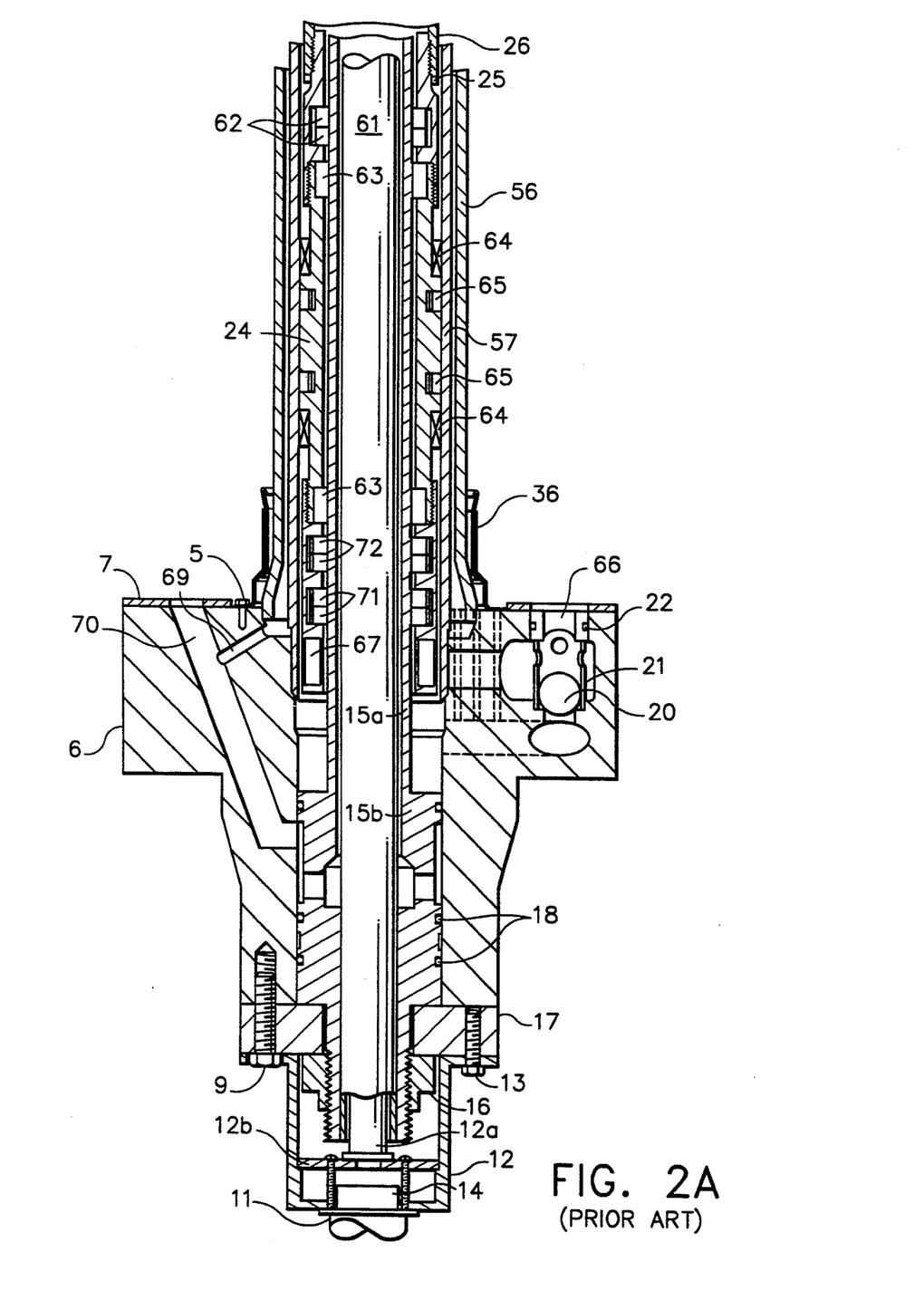
FIGS. 2A and 2B are sectional views of the lower and upper portions respectively of a conventional control rod drive.
Figure 2B:
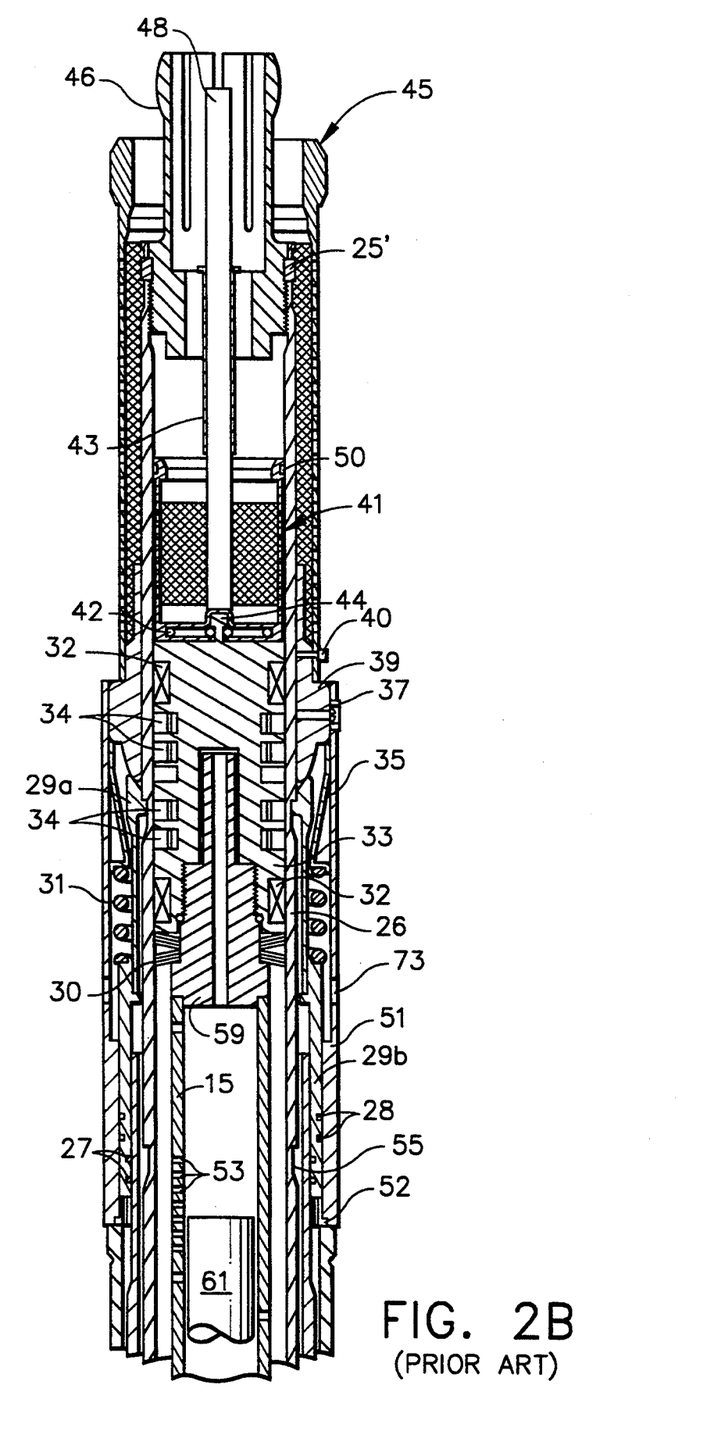

Referring to FIGS. 2A and 2B, the CRD further comprises an inner cylinder 57 and an outer tube 56, which form an annulus through which water is applied to a collet piston 29b to unlock index tube 26. The internal diameter of inner cylinder 57 is honed to provide the surface required for expanding seals 65 on the drive piston 24. A collet housing 51 (which is part of outer tube 56) is provided with ports 73 to permit free passage of water from the clearance space between the outer diameter of index tube 26 and the inner diameter of inner cylinder 57 and the inner diameter of collet housing 51. The bottom of collet piston 29b normally rests against a spacer 52 in the upper portion of the annular space. Grooves in the spacer permit the passage of water between the bottom of the collet piston 29b and the passage area within the cylinder, tube and flange.

Welded pipes 80 and 81, installed in the CRD housing, port water to the insert port 66 and the withdraw port 70 respectively. A port 69 below outer tube 56 connects to withdraw port 70 in CRD flange 6 so that water is applied through the annulus to collet piston 29b when a withdraw signal is given.

The CRD is secured to the CRD housing flange 10a by eight mounting bolts (not shown). A pressure-tight seal is effected between the mated flanges by O-ring gaskets (not shown) mounted in a spacer 7 secured to the CRD flange face.

Insert port 66 contains a ball check valve which consists of check-valve ball 20, ball retainer 21, and retainer O-ring 22. This valve directs HCU accumulator pressure or reactor pressure to the underside of drive piston 24 during scram operation. Port 66 is connected internally to the annulus and the bottom of drive piston 24 and serves as the inlet for water during normal insertion or scram. Water enters this port for a brief period in response to a withdraw signal to move the index tube 26 upward so that collet fingers 29a are cammed out. Following this brief unlocking period, water from below drive piston 24 is discharged through port 66 and through the under-piston hydraulic line for the duration of the withdraw signal. During the time the CRD remains stationary, cooling water passes through an annulus internal to flange 6 to the area between outer tube 56 and the inside of the thermal sleeve to cool the CRD.

The withdraw port 70 serves as the inlet port for water during control rod withdrawal and as the outlet port for water during normal or scram insertion. It connects with internal porting and annuli to the area above drive piston 24. During a withdraw operation, water is supplied from port 70 through a small connecting port in CRD flange 6 to the annular space between outer tube 56 and inner cylinder 57 for application to the bottom of collet piston 29b.

The locking mechanism consists of collet fingers 29a, collet piston 29b, barrel 35, guide cap 39, and collet spring 31. The mechanism is contained in the collet housing 51 portion of outer tube 56 and is the means by which index tube 26 is locked to hold the control rod at a selected position.

The collet assembly consists of a collet piston 29b fitted with four piston seal rings, tow outer 28 and tow inner 27, six fingers 29a and a retainer (not shown) and is set into a bore in the collet housing 51. In addition, a spring 31, barrel 35 and guide cap 39 complete the components installed in the collet housing 51.

Guide cap 39 is held in place above the collet by three plugs 37 which penetrate the upper end of collet housing 51, and which are held in place by fillister-head screws. It provides a fixed camming surface to guide collet fingers 29a upward and away from index tube 26 when unlocking pressure is applied to collet piston 29b. Barrel 35 is installed below guide cap 39 and serves as fixed seat for collet spring 31.

The collet mechanism requires a hydraulic pressure greater than reactor pressure to unlock for CRD-withdraw movement. A preload is placed on collet spring 31 at assembly and must be overcome before the collet can be moved toward the unlocked position. For control rod withdrawal, a brief insert signal is applied to move index tube 26 upward to relieve the axial load on collet fingers 29a, camming them outward against the sloping lower surface of index tube locking notch 55. Immediately thereafter, withdraw pressure is applied. In addition to moving index tube 26 downward, this pressure is at the same time applied to the bottom of collet piston 29b to overcome the spring pressure and cam the fingers 29a outward against guide cap 39. When the withdraw signal ceases, the spring pressure forces the collet downward so that fingers 29a slip off guide cap 39. As index tube 26 settles downward, collet fingers 29a snap into the next higher notch and lock. When collet fingers 29a engage a locking notch 55, collet piston 29b transfers the control rod weight from index tube 26 to the outer tube 56.

Unlocking is not required for CRD insertion. The collet fingers are cammed out of the locking notch as index tube 26 moves upward. The fingers 29a grip the outside wall of index tube 26 and snap into the next lower locking notch for single-notch insertion to hold index tube 26 in position. For scram insertion, index tube 26 moves continuously to its limit of travel during which the fingers snap into and cam out of each locking notch as index tube 26 moves upward. When the insert, withdraw or scram pressures are removed, index tube 26 settles back, from the limit of travel, and locks to hold the control rod in the required position.

The drive piston 24 and index tube 26 are the primary subassembly in the CRD, providing the driving link with the control rod as well as the notches for The locking mechanism collet fingers. Drive piston 24 operates between positive end stops, with a hydraulic cushion provided at the upper end only. Index tube 26 is a nitrided stainless-steel tube threaded internally at both ends. The spud 46 is threaded to its upper end, while the head of the drive piston 24 is threaded to its lower end. Both connections are secured in place by means of bands 25, 25' with tab locks.

There are 25 notches machined into the wall of index tube 26, all but one of which are locking notches 55 spaced at 6-inch intervals. The uppermost surfaces of these notches engage collet fingers 29a, providing 24 increments at which a control rod may be positioned and preventing inadvertent withdrawal of the rod from the core. The lower surfaces of the locking notches slope gradually so that the collet fingers cam outward for control rod insertion.

Drive piston 24 is provided with internal (62, 71, 72) and external seal rings (65), and is operated in the annular space between piston tube 15 and inner cylinder 57. Internal (63) and external (64) bushings prevent metal-to-metal contact between drive piston 24 and the surface of piston tube 15 and the wall of inner cylinder 57 respectively.

When a control rod is driven upward to its fully inserted position during normal operation or scram, the upper end of the piston head contacts the spring washers 30 which are installed below the stop piston 33. Washers 30 and stop piston 33 provide the upper limit of travel for drive piston 24. The spring washers, together with the series of buffer orifices 53 in the upper portion of piston tube 15, effectively cushion the moving drive piston 24 and reduce the shock of impact when the piston head contacts the stop piston.

The magnet housing, which comprises the lower end of drive piston 24, contains a ring magnet 67 which actuates the switches of the position indicator probe (not shown) to provide remote electrical signals indicating control rod position.

The piston tube assembly forms the innermost cylindrical wall of the CRD. It is a welded unit consisting of piston tube 15 and a position indicator tube 61. The piston tube assembly provides three basic functions for CRD operation: (a) position indicator tube 61 is a pressure-containing part which forms a drywell housing for a position indicator probe 12a (see FIG. 2A); (b) piston tube 15 provides for the porting of water to or from the upper end of the piston head portion of drive piston 24 during rod movement; and (c) during control rod scram insertion, buffer orifices 53 in piston tube 15 progressively shut off water flow to provide gradual deceleration of drive piston 24 and index tube 26.

A stud 59 is welded to the upper end of tube piston 15. Stud 59 is threaded for mounting the stop piston 33. A shoulder on the stud, just below the threaded section, is machined to provide a recess for the spring washers 30 that cushion the upward movement of drive piston 24.

The tube section 15a and head section 15b of piston tube 15 provide space for position indicator tube 61, which is welded to the inner diameter of the threaded end of head section 15b and extends upward through the length of tube section 15a, terminating in a watertight cap near the upper end of the tube section. Piston tube 15 is secured by a nut 16 at the lower end of the CRD. Two horizontal ports are provided in the head section 15b, 180° apart, to transmit water between the withdraw porting in the CRD flange and the annulus between indicator tube 61 and tube section 15a of piston tube 15 for application to the top of drive piston 24. Three O-ring seals 18 are installed around head section 15b. Two seal the bottom of the CRD against water leakage and one seals the drive piston 24 under-piston pressure from the drive piston over-piston pressure.

The position indicator probe 12a, which is slidably inserted into indicator tube 61, transmits electrical signals to provide remote indications of control rod position and CRD operating temperature. Probe 12a is welded to a plate 12b, which plate is in turn bolted to housing 12. Housing 12 is secured to the CRD ring flange 17 by screws 13. A cable clamp (not shown), located at the bottom of a plug 14, secures a connecting electrical cable (not shown) to plug 14. Ring flange 17 is in turn 1secured to the CRD housing by screws 9. Thus, probe 2a, housing 12 and cable clamp 11 (with the cables passing therethrough) can be removed as a unit.

The stop piston 33 threads onto the stud 59 at the upper end of piston tube 15. This piston provides the seal between reactor pressure and the area above the drive piston. It also functions as a positive-end stop at the upper limit of drive piston travel. Six spring washers 30 below the stop piston help absorb the final mechanical shock at the end of travel. Seals 34 include an upper pair used to maintain pressure above the drive piston during CRD withdrawal and a lower pair used only during the cushioning of the drive piston at the upper end of the stroke. Two external bushings 32 prevent metal-to-metal contact between stop piston 33 and index tube 26.

As seen in FIG. 2B, spud 46, which connects the control rod (not shown) and the CRD, is threaded onto the upper end of index tube 26 and held in place by locking band 25'. The coupling arrangement will accommodate a small amount of angular misalignment between the CRD and the control rod. Six spring fingers permit the spud to enter the mating socket (not shown) on the control rod.

The uncoupling rod consists of a rod 48 and a tube 43, supported in the base of the spud at the upper end of the CRD. The rod 48 is welded to the flared end of tube 43 such that a dimension of 1.125 inch exists between the top of rod 48 and the top end of spud 46. This is a critical dimension and must be maintained to ensure proper CRD and control-rod coupling. For this reasons, uncoupling rods cannot be interchanged unless the critical dimension is verified.

An outer filter 45 and the inner filter 41 are installed near the upper end of the CRD. The outer filter is mounted on guide cap 39 using screws 40. A center lug 44 at the top of stop piston 33 is provided for mounting inner filter 41. The inner filter is held in place by a spring clip 42 which grips lug 44. Both filters are provided to filter reactor water flowing into the CRD, removing foreign particles or abrasive matter that could result in internal damage and excessive wear. Strainer 36, which is secured by screws 5, reduces the entry of coarse foreign particles from reactor water into the scram ports and ball-check valve in the CRD flange in the event such particles penetrate or bypass the outer filter 45. The inner filter is sealed against water leakage by means of a seal ring 50 installed in the groove in the ring.

In order to perform maintenance on a CRD, the CRD must be removed from its CRD housing. Prior to reinstallation, leak tests are performed using a leak test fixture. The leak test is used to determine the leakage rate of the CRD internal and external drive seals, stop piston seals, collet piston seals, ball check valve and the condition of the cooling water orifice in the CRD flange. In addition, CRD stroking capability can be bench-tested using the leak test equipment. These tests are useful in demonstrating proper CRD assembly. They should be performed on a reconditioned CRD in which the internal seals were replaced and immediately prior to installation in the reactor vessel CRD housing.

SUMMARY OF THE INVENTION

The present invention is a multi-port tool which tests for leaks in the seals of a control rod drive that has been removed from its housing. The fixture is attached to the flange of the control rod drive using quick-release clamps. Two ports of the fixture are respectively coupled to the insert and withdraw ports of the control rod drive. A source of demineralized water at a constant pressure is applied to an inlet port of the leak test fixture. The pressurized water is applied to the control rod drive while the index tube is restrained by a restraining rig. A number of valves are selectively opened or closed to provide a flow path for the pressurized water to either the insert port or the withdraw port. The leakage rate at each of a number of leakage points is determined when the pressurized water is applied at the insert port only and again when the pressurized water is applied at the withdraw port only.

DETAILED DESCRIPTION OF THE PREFERRED EMBODIMENTS

To test the CRD seals for leakage, the strainer 36 (see FIG. 2A) is removed from the CRD. With the CRD fully retracted, a restraining block and a restraining rig (conventional devices not shown in the drawings) are installed to prevent displacement of the index tube and spud assembly during testing. A pair of rubber O-rings (not shown) are greased and respectively installed around the insert port 66 and the withdraw port 70 inside the O-ring spacer holes. These O-rings seal between the leak test fixture and the CRD flange.

In accordance with a preferred embodiment of the invention (see FIGS. 3 and 4), the leak test fixture comprises a U-shaped manifold 102, a pair of L-shaped brackets 104, 104' bolted to the side faces of the legs of U-shaped manifold 102, and a pair of toggle clamps 106, 106' respectively bolted to the horizontal portions of L-shaped brackets 104, 104'. Each toggle clamp has a respective swivel foot 108, 108' comprising a metal spindle and a metal swivel foot.

Figure 3:
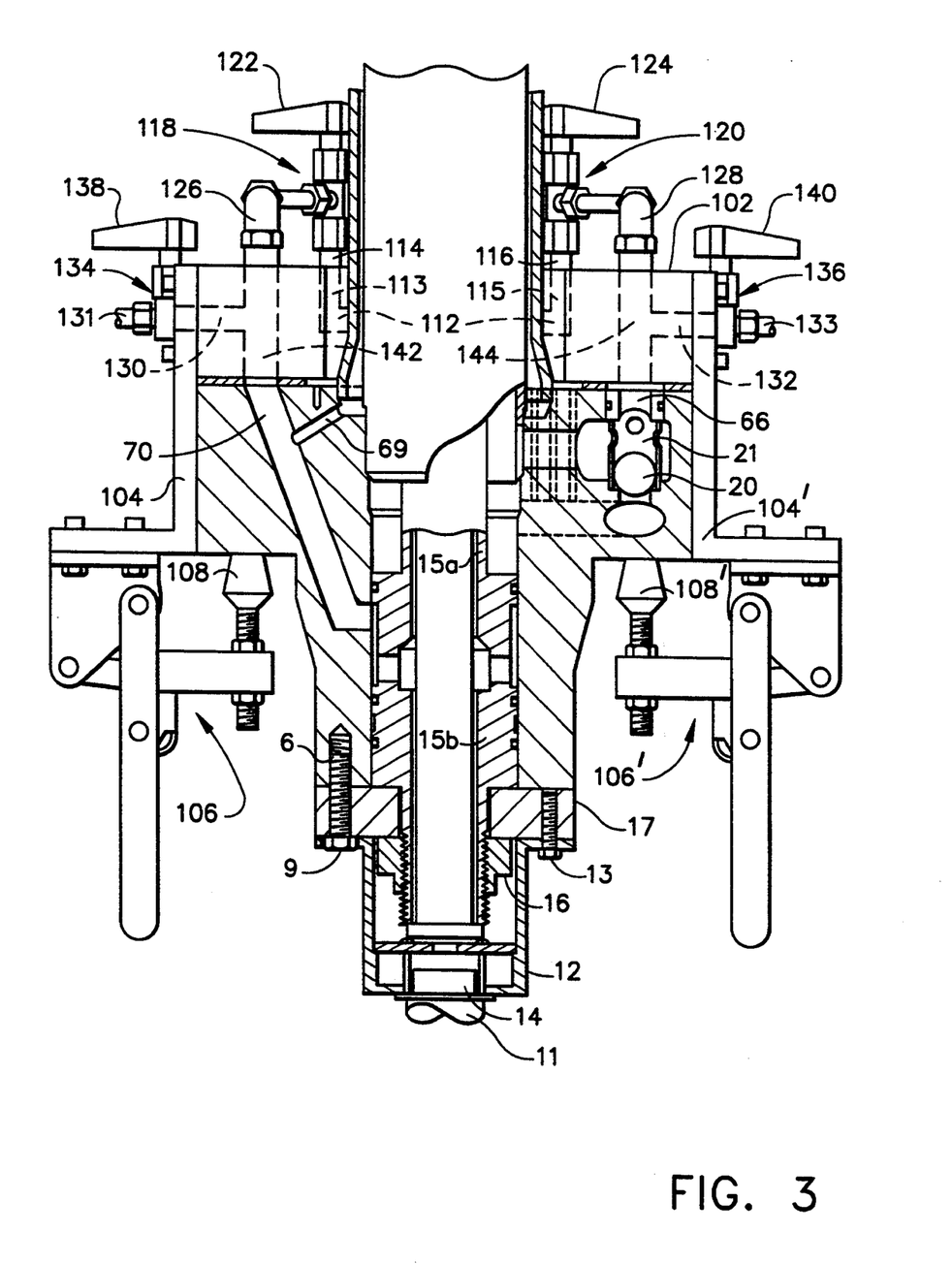
FIG. 3 is a sectional view of the lower portion of a conventional control rod drive with a leak test fixture in accordance with a preferred embodiment of the invention mounted thereon.
Figure 4:
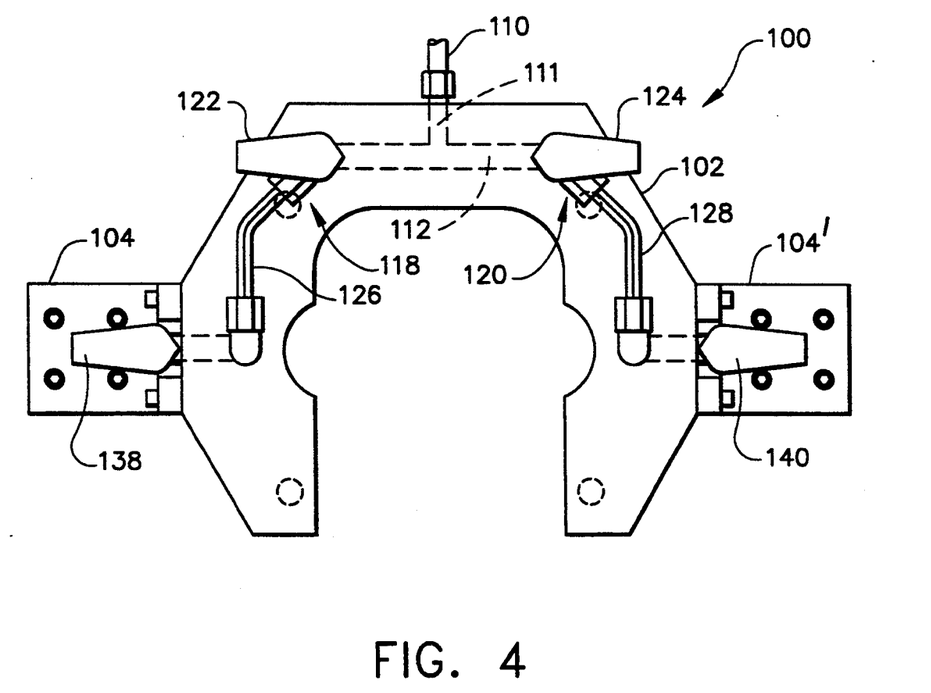
FIG. 4 is a top view of the leak test fixture depicted in FIG. 3.

The leak test fixture of the invention is installed on the CRD flange using the CRD dowel alignment pins (not shown), which extend vertically upward from the top surface of the CRD flange, as guides. The toggle clamps, when actuated by manipulation of the respective handles, serve to clamp the fixture to the CRD for testing. The swivel feet are adjusted to obtain approximately equal force on each O-ring.

As previously described in the Background of the Invention section, the CRD is operated hydraulically. Water flows into the insert port 66 and out the withdraw port 70 during control rod insertion, and vice versa during control rod withdrawal. To produce the hydraulic pressure required to move the control rod, the seals in the CRD must have a leakage rate below a predetermined threshold. The leakage rate is determined by applying pressurized water through the leak test fixture to the insert (66) or withdraw (70) port and measuring the leakage at various points of the CRD.

As shown in FIGS. 3 and 4, the manifold 102 has an inlet channel 111 which connects an inlet 110 to a horizontal channel 112. Inlet 110 can be connected to a source of demineralized water (e.g., at 200 psi and 5 gpm) by a hose (not shown). The ends of channel 112 are respectively in flow communication with vertical channels 113 and 115 internal to manifold 102. Channel 113 can be coupled to another internal vertical channel 142 via a first external flow path comprising tubing 114, two-way valve 118 and tubing 126. Similarly, channel 115 can be coupled to an internal vertical channel 144 via a second external flow path comprising tubing 116, two-way valve 120 and tubing 128. The lower end of channel 142 is coupled to withdraw port 70; the lower end of channel 144 is coupled to insert port 66. A midportion of channel 142 is in flow communication with an internal horizontal channel 130; a midportion of channel 144 is in flow communication with an internal horizontal channel 132. Channel 130 can be coupled to outlet 131 by operation of a two-way valve 134; channel 132 can be coupled to outlet 133 by operation of a two-way valve 136.

The valves of the leak test fixture in accordance with the invention can be manually operated (by turning of handles 122, 124,138 and 140) to provide water flow either in the direction, from the insert port through the CRD and out the withdraw port or in the direction from the withdraw port through the CRD and out the insert port. In the first case, valves 120 and 134 are open, and valves 118 and 136 are closed. In flow sequence, water flows through inlet 110, valve 120, tubing 128, channel 144, insert port 66, through the CRD and out withdraw port 70, channel 142, channel 130, valve 134 and outlet 131. In the second case, valves 120 and 134 are closed, and valves 118 and 136 are open. In flow sequence, water flows through inlet 110, valve 118, tubing 126, channel 142, withdraw port 70, through the CRD and out insert port 66, channel 144, channel 132, valve 136 and outlet 133.

The outer drive seals, inner drive seals, check valve and stop piston seals of the restrained CRD are tested for leakage by applying demineralized water at constant pressure at insert port 66. Receptacles are arranged to collect the leakage water at the leakage points: the collet housing, the withdraw port, the vessel ports and the spud, respectively. The collet piston, inner drive seals and stop piston seals are tested for leakage by applying demineralized water at constant pressure at withdraw port 70. Receptacles are arranged to collect the leakage water at the leakage points: the collet housing, the insert and vessel ports and the spud, respectively.

When the restraining rig has been removed, the leak test fixture can also be used to determine whether a reassembled CRD will operate properly through its entire stroke. With the CRD index tube in the fully retracted position, pressure is slowly applied from the demineralized water supply. The index tube should start to extend when the supply pressure at the insert port is approximately 20–30 psig. When the index tube starts to extend, the supply pressure is maintained constant. The index tube is observed as it extends. The observer must verify that the index tube extends to the full-cut position, with no sudden stops. Proper retraction of the index tube can thereafter be tested by switching all valves of the leak test fixture to their opposite state, thereby reversing the flow of water through the CRD.

The preferred embodiment of the leak test fixture has been disclosed for the purpose of illustration. Variations and modifications of the disclosed structure which do not depart from the concept of this invention will be readily apparent to mechanical engineers skilled in the art of tooling. All such variations and modifications are intended to be encompassed by the claims set forth hereinafter.

We claim:

1. A leak test fixture comprising an inlet, first and second outlets, first and second openings, first through fourth tow-way valves, first flow path means connecting said inlet to said first and second valves, second flow path means connecting said first valve to said first opening, third flow path means connecting said second valve to said second opening, fourth flow path means connecting said second flow path means to said third valve, and fifth flow path means connecting said third flow path means to said fourth valve, wherein said inlet is in flow communication with said first opening when said first valve is open and is in flow communication with said second opening when said second valve is open, said first outlet is in flow communication with said first opening when said third valve is open, and said second outlet is in flow communication with said second opening when said fourth valve is open, further comprising a manifold, at least a portion of each of said first through fifth flow path means being internal to said manifold, and said first through fourth valves being external to said manifold.

2. The leak test fixture as defined in claim 1, wherein said manifold is generally U-shaped in a horizontal plane.

3. The leak test fixture as defined in claim 2, wherein said first and second openings are co-planar.

4. The leak test fixture as defined in claim 2, further comprising clamping means connected to said manifold by brackets.

5. The leak test fixture as defined in claim 4, wherein said clamping means comprise first and second toggle clamps connected to said manifold by first and second brackets respectively.

6. The leak test fixture as defined in claim 1, further comprising first through fourth means for selectively opening or closing said first through fourth valves respectively.

7. The leak test fixture as defined in claim 6, wherein each of said means for selectively opening or closing a respective one of said valves comprises a rotatable handle.

8. The leak test fixture as defined in claim 6, wherein said selecting means comprises first through fourth rotatable handles respectively coupled to said first through valves, said valves being opened and closed by rotation of said handles.

9. A leak test fixture for testing seals of a control rod drive for leakage, said control rod drive having a displaceable index tube and having a flange with an insert port and a withdraw port for controlling displacement of said index tube via pressurized water, comprising:
a source of pressurized water;
an inlet in flow communication with said source of pressurized water;
first and second outlets;
first and second openings arranged to be respectively coupled to said insert and withdraw ports when said leak test fixture is properly positioned on said control rod drive flange;
means for channeling said pressurized water from said inlet to said insert port and from said withdraw port to said first outlet in a first state and from said inlet to said withdraw port and from said insert port to said second outlet in a second state; and
means for selecting one of said first and second states of said channeling means.

10. The leak test fixture as defined in claim 9, wherein said channeling means comprises first through fourth two-way valves, first flow path means connecting said inlet to said first and second valves, second flow path means connecting said first valve to said first opening, third flow path means connecting said second valve to said second opening, fourth flow path means connecting said second flow path means to said third valve, and fifth flow path means connecting said third flow path means to said fourth valve, wherein said channeling means is in said first state when first and fourth valves are open and said second and third valves are closed, and in said second state when first and fourth valves are closed and said second and third valves are open.

11. The leak test fixture as defined in claim 10, further comprising a manifold, at least a portion of each of said first through fifth flow path means being internal to said manifold, and said first through fourth valves being external to said manifold.

12. The leak test fixture as defined in claim 11, wherein said manifold is generally U-shaped in a horizontal plane.

13. The leak test fixture as defined in claim 11, further comprising means for clamping said leak test fixture to said control rod drive flange, said clamping means being connected to said manifold by brackets.

14. The leak test fixture as defined in claim 13, wherein said clamping means comprise first and second toggle clamps connected to said manifold by first and second brackets respectively.

15. The leak test fixture as defined in claim 9, wherein said first and second openings are co-planar.

* * * * *